(12) United States Patent
Li

(10) Patent No.: US 11,106,244 B2
(45) Date of Patent: Aug. 31, 2021

(54) FLEXIBLE TOUCH SCREEN AND FLEXIBLE DISPLAY DEVICE

(71) Applicant: SHENZHEN ROYOLE TECHNOLOGIES CO., LTD., Shenzhen (CN)

(72) Inventor: He Li, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/649,832

(22) PCT Filed: Sep. 26, 2017

(86) PCT No.: PCT/CN2017/103396
§ 371 (c)(1),
(2) Date: Mar. 23, 2020

(87) PCT Pub. No.: WO2019/061016
PCT Pub. Date: Apr. 4, 2019

(65) Prior Publication Data
US 2020/0285281 A1 Sep. 10, 2020

(51) Int. Cl.
*G06F 1/16* (2006.01)
(52) U.S. Cl.
CPC .......... *G06F 1/1652* (2013.01); *G06F 1/1643* (2013.01)
(58) Field of Classification Search
CPC combination set(s) only.
See application file for complete search history.

(56) References Cited

U.S. PATENT DOCUMENTS

| | | | | |
|---|---|---|---|---|
| 9,634,284 | B2* | 4/2017 | Chun | H01L 51/0097 |
| 9,952,723 | B2* | 4/2018 | Park | G06F 3/0446 |
| 10,325,966 | B2* | 6/2019 | Isa | G06F 3/0443 |
| 10,429,895 | B2* | 10/2019 | Lee | G06F 1/1652 |

(Continued)

FOREIGN PATENT DOCUMENTS

| | | |
|---|---|---|
| CN | 104216556 A | 12/2014 |
| CN | 204314857 U | 5/2015 |

(Continued)

OTHER PUBLICATIONS

International Search Report issued in corresponding International Application No. PCT/CN2017/103396, dated Jun. 27, 2018, pp. 1-2, State Intellectual Property Office of the P.R. China, Beijing, China.

*Primary Examiner* — Lisa Lea-Edmonds
(74) *Attorney, Agent, or Firm* — Hauptman Ham, LLP

(57) ABSTRACT

A flexible touch screen and a flexible display device including the flexible touch screen are provided in the present disclosure. The flexible touch screen includes a first substrate and a first conductive layer located on the first substrate. The first substrate includes a first surface and a second surface opposite to the first surface. When the flexible touch screen is bent in a first direction in a manner that the first surface becomes convex and the second surface becomes concave, the first conductive layer is located on one side of the first substrate where the first surface is located and is subject to compressive stress or zero stress. The flexible touch screen of the present disclosure can effectively improve an anti-bending ability and prolong the service life.

20 Claims, 8 Drawing Sheets

(56) References Cited

U.S. PATENT DOCUMENTS

| | | | |
|---|---|---|---|
| 10,691,175 B2* | 6/2020 | Lee | G06F 1/1643 |
| 2014/0063719 A1* | 3/2014 | Yamazaki | G06F 1/1637 |
| | | | 361/679.21 |
| 2014/0354558 A1* | 12/2014 | Cho | G06F 3/0412 |
| | | | 345/173 |
| 2015/0115248 A1* | 4/2015 | Chun | H01L 51/5253 |
| | | | 257/40 |
| 2015/0200375 A1* | 7/2015 | Kim | H01L 27/3244 |
| | | | 257/40 |
| 2017/0147117 A1* | 5/2017 | Song | G06F 3/0443 |
| 2018/0204884 A1* | 7/2018 | Isa | H05B 33/26 |
| 2019/0204872 A1* | 7/2019 | Lee | G06F 1/1616 |
| 2019/0384363 A1* | 12/2019 | Lee | G06F 1/1643 |

FOREIGN PATENT DOCUMENTS

| | | |
|---|---|---|
| CN | 104779266 A | 7/2015 |
| CN | 106371672 A | 2/2017 |

* cited by examiner

FLEXIBLE TOUCH SCREEN AND FLEXIBLE DISPLAY DEVICE

RELATED APPLICATION

The present application is a National Phase of International Application Number PCT/CN2017/103396, filed Sep. 26, 2017.

TECHNICAL FIELD

The present disclosure relates to fields of touch screens, and in particular, to a flexible touch screen and a flexible display device.

BACKGROUND

Flexible display devices have the advantages of thin, low power consumption, bendability, good flexibility, high durability, etc., so they have been favored by a majority of users. A flexible display device includes a flexible touch screen (Flexible Sensor, FS). The flexible touch screen generally refers to a touch screen made of bendable and flexible materials. The flexible touch screen includes a touch layer. The touch layer is configured to receive user's touch operations and perform image display or video playback according to the user's touch operations. Generally, the touch layer includes a conductive layer. When the flexible touch screen is bent, the wires in the conductive layer are easily damaged by tensile stress, which causes a conductive failure of the conductive layer in the touch layer, and causes a failure of the flexible touch screen.

SUMMARY

A flexible touch screen is provided in embodiments of the present disclosure. The flexible touch screen includes a first substrate and a first conductive layer located on the first substrate. The first substrate includes a first surface and a second surface opposite to the first surface. When the flexible touch screen is bent towards a first direction in a manner that the first surface becomes convex and the second surface becomes concave, the first conductive layer is located on one side of the first substrate where the first surface is located and is subjected to compressive stress or zero stress.

Compared with the related art, the flexible touch screen of the present disclosure is bendable. The first conductive layer is located on one side where the first surface is located. When the flexible touch screen is bent towards the first direction, the first conductive layer is subjected to compressive stress or zero stress. Furthermore, the materials of the first conductive layer itself can resist strong compressive stress. Therefore, a problem of poor conductivity of the conductive layer in the touch layer of the flexible touch screen can be effectively improved.

A flexible display device is also provided in embodiments of the present disclosure. The flexible display device includes a flexible touch screen according to any one of the foregoing embodiments.

BRIEF DESCRIPTION OF THE ACCOMPANYING DRAWINGS

In order to more clearly explain the embodiments of the present disclosure or the technical solutions in the prior art, the drawings used in the embodiments are briefly introduced below. Obviously, the drawings in the following description are only some of the present disclosure. For those of ordinary skill in the art, other drawings may be obtained based on these drawings without paying any creative works.

DETAILED DESCRIPTION OF ILLUSTRATED EMBODIMENTS

The technical solutions in the embodiments of the present disclosure are clearly and completely described in the following with reference to the drawings in the embodiments of the present disclosure. It is obvious that the described embodiments are only a part of the embodiments of the present disclosure, and not all of the embodiments. All other embodiments obtained by a person of ordinary skill in the art based on the embodiments of the present disclosure without departing from the inventive scope are also the scope of the present disclosure.

Figure 1:
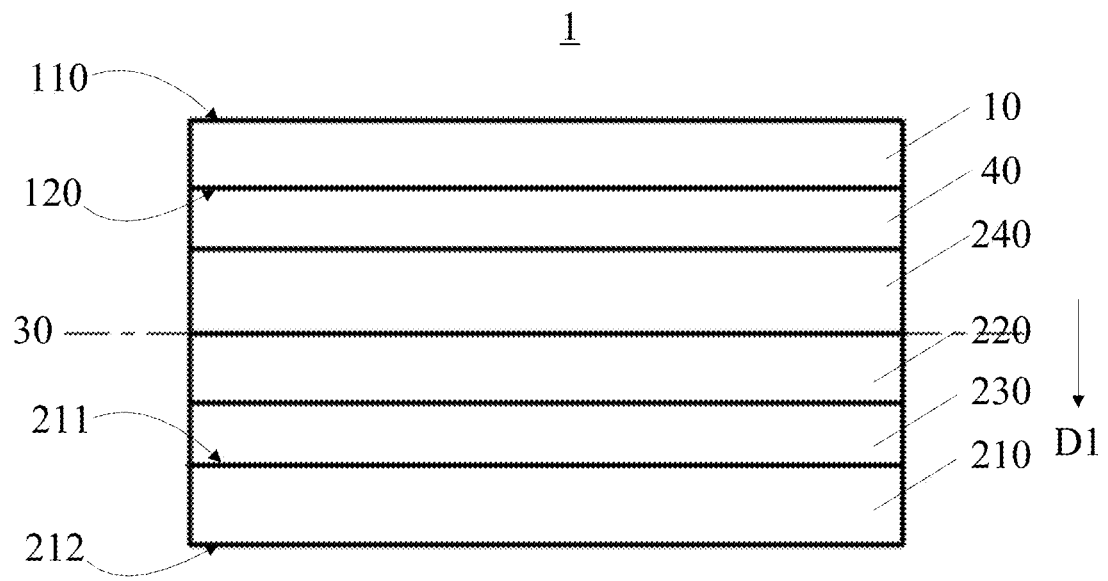
FIG. 1 is a schematic structural diagram of a flexible touch screen in a non-bent state according to a first embodiment of the present disclosure.
Figure 2:
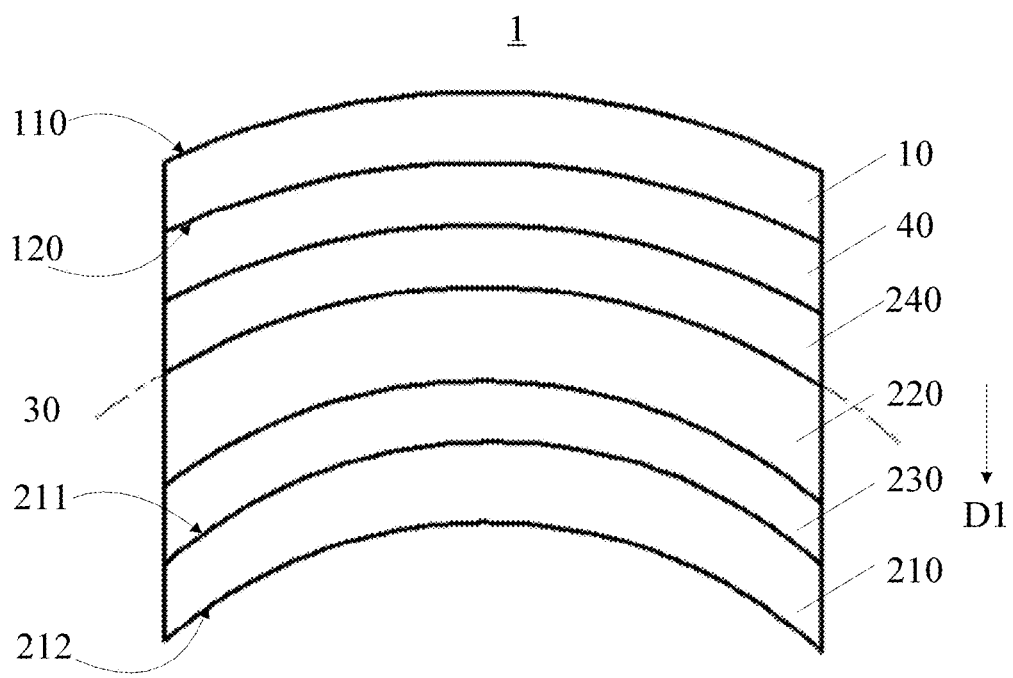
FIG. 2 is a schematic structural diagram of a flexible touch screen in a bent state according to a first embodiment of the present disclosure.

Please referring to FIG. 1 and FIG. 2, FIG. 1 is a schematic structural diagram of a flexible touch screen in a non-bent state according to a first embodiment of the present disclosure; FIG. 2 is a schematic structural diagram of a flexible touch screen in a bent state according to a first embodiment of the present disclosure. The flexible touch screen 1 includes a first substrate 210 and a first conductive layer 230 located on the first substrate 210. The first substrate 210 includes a first surface 211 and a second surface 212 opposite to the first surface 211. A direction from the first surface 211 to the second surface 212 is referred to be a first direction D1. When the flexible touch screen 1 is bent toward the first direction D1 in a manner that the first surface 211 becomes convex and the second surface 212 becomes concave, the first conductive layer 230 is located on one side of the first substrate 210 where the first surface 211 is located and is subject to compressive stress or zero stress.

When the flexible touch screen 1 is bent toward the first direction D1, the first conductive layer 230 is located on one side of the first substrate 210 where the first surface 211 is located and is subjected to compressive stress which is generated by other layer structures located on one side of the first conductive layer 230 away from the first substrate 210. In this embodiment, the flexible touch screen 1 further includes a covering layer 10. The covering layer 10 is served as an encapsulation layer of the flexible touch screen 1. The covering layer 10 includes a top surface 110 and a bottom surface 120 opposite to the top surface 110. The top surface 110 is an outer surface of the flexible touch screen 1. The bottom surface 120 is located adjacent to the first conductive layer 230. In this embodiment, the first substrate 210 and the first conductive layer 230 cooperatively constitute a touch layer of the flexible touch screen 1. The touch layer and the covering layer 10 are bendable, so that a center of curvature of the touch layer and the covering layer 10 is located outside of the bottom surface 120. The flexible touch screen 1 includes a neutral plane 30. The first conductive layer 230 may be located inside the neutral plane 30 or outside the neutral plane 30. The neutral plane 30 may be a surface that has neither compressive stress nor tensile stress when the flexible touch screen 1 is bent. When the first conductive layer 230 is located in the neutral plane 30, the first conductive layer 230 cannot be subjected to compressive stress or tensile stress. In other embodiments, the first conductive layer 230 is located outside the neutral plane 30 and is subjected to compressive stress.

In this embodiment, the flexible touch screen 1 further includes a transparent adhesive layer 40. The transparent adhesive layer 40 is located between the covering layer 10 and the first conductive layer 230 and is configured to adhere the covering layer 10 and the first conductive layer 230.

The covering layer 10 is made of a material having a refractive index of 1.5 to 2.0. For similar materials, the larger the refractive index, the smaller the thickness of the material. Therefore, using a material having a larger refractive index is beneficial to reduce a thickness of the flexible touch screen 1. Preferably, the materials used for the covering layer 10 is acrylic resins or urethane resins. The covering layer 10 serves as an encapsulation layer of the flexible touch screen 1 and has good crack resistance and water resistance.

The transparent adhesive layer 40 is an optically clear adhesive (OCA). The optically clear adhesive has a light transmittance of more than 90%, good bonding strength, and small curing shrinkage. The transparent adhesive layer 40 may be a resistive optically clear adhesive or a capacitive optically clear adhesive. The resistive optically clear adhesive can be used, and its thicknesses can be 50 um or 25 um, or other values. A capacitive optically clear adhesive can be used, and its thickness can be 100 um, 175 um, 200 um, 250 um, or other values. In practical applications, the transparent adhesive layer 40 may have one layer or multiple layers.

The first substrate 210 is located on one surface of the first conductive layer 230 away from the transparent adhesive layer 40, and is configured to increase the strength of the flexible touch screen 1. In practical applications, the first substrate 210 may have one layer or multiple layers.

The first conductive layer 230 includes first conductive wires 2301 extending along a second direction D2. The flexible touch screen 1 is bent around the first axis I, and the second direction D2 is perpendicular to the first axis I, the first axis I maintains a straight state when the flexible touch screen is bent. For the first conductive wires 2301, referring to FIG. 11, the first conductive wires 2301 in this embodiment are the same as the first conductive wires 2301 in FIG. 11.

In this embodiment, the flexible touch screen 1 further includes a second conductive layer 240. The second conductive layer 240 is located on one side of the first conductive layer 230 away from the first substrate 210. The second conductive layer 240 is insulated from the first conductive layer 230. An insulating layer 220 is located between the first conducting layer 230 and second conducting layer 220. The insulating layer 220 can be a transparent adhesive layer, that is, an optically clear adhesive. The second conductive layer 240 includes second conductive wires 2401 extending along a third direction D3, and the third direction D3 is parallel to the first axis I. For the second conductive wires 2401, please referring to FIG. 12, the second conductive wires 2401 in this embodiment are the same as the second conductive wires 2401 in FIG. 12.

It can be understood that, in other embodiments, the second conductive layer 240 may also be located on the second surface 212 of the first substrate 210.

Compared with the related art, the flexible touch screen 1 of the present disclosure can be bent. When the first conductive layer 230 is located on the side where the first surface 211 is located and the flexible touch screen 1 is bent toward the first direction D1, the first conductive layer 230 is subjected to compressive stress or zero stress, and the materials of the first conductive layer 230 have the characteristic of resisting strong compressive stress, so it can effectively improve the problem of poor conductivity of the conductive layer in the touch layer of the flexible touch screen 1.

Figure 3:
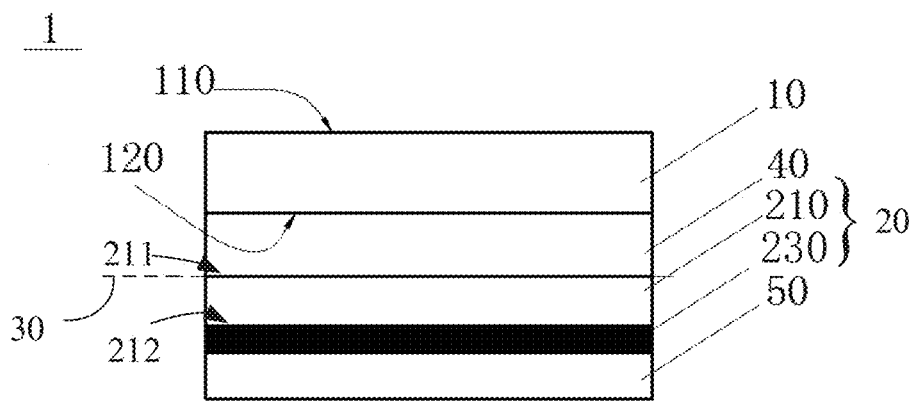
FIG. 3 is a schematic structural diagram of a flexible touch screen in a non-bent state according to a second embodiment of the present disclosure.
Figure 4:
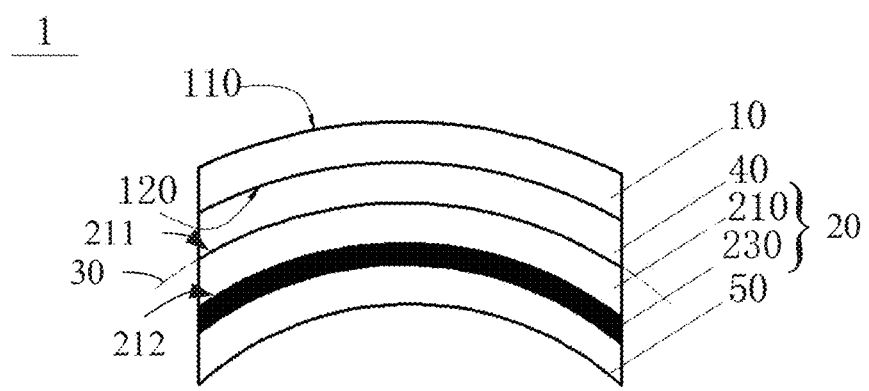
FIG. 4 is a schematic structural diagram of a flexible touch screen in a bent state according to a second embodiment of the present disclosure.

Please referring to FIG. 3 and FIG. 4 together, FIG. 3 is a schematic structural diagram of a flexible touch screen in a non-bent state according to a second embodiment of the present disclosure; FIG. 4 is a schematic structural diagram of a flexible touch screen in a bent state according to a second embodiment of the present disclosure. In this embodiment, the flexible touch screen 1 includes a first substrate 210 and a first conductive layer 230 located on the first substrate 210. The first substrate 210 includes a first surface 211 and a second surface 212 opposite to the first surface 211. In this embodiment, the first conductive layer 230 is located on the second surface 212. A direction from the first surface 211 to the second surface 212 is first direction D1. When the flexible touch screen 1 is bent toward the first direction D1 in a manner that the first surface 211 becomes convex and the second surface 212 becomes concave, the first conductive layer 230 is located on one side of the first substrate where the second surface 212 is located and is subjected to compressive stress or zero stress.

In this embodiment, the flexible touch screen 1 further includes a covering layer 10 and a transparent adhesive layer 40. The covering layer 10 is served as an encapsulation layer of the flexible touch screen 1. The covering layer 10 includes a top surface 110 and a bottom surface 120 opposite to the top surface 110. The top surface 110 is an outer surface of the flexible touch screen 1. The transparent adhesive layer 40 is located between the covering layer 10 and the first substrate 210 and is configured to adhere the covering layer 10 and the first substrate 210. The protective layer 50 is located on one surface of the first conductive layer 230 away from the first substrate 210 and is configured to protect the first conductive layer 230.

In this embodiment, the neutral plane 30 and one surface of the transparent adhesive layer 40 contacting with the first substrate 210 are coplanar. When the flexible touch screen 1 is bent in the first direction D1, the curved shape has a center of curvature. The layers of the flexible touch screen 1 located on one side of the neutral plane 30 away from the center of the curvature are subject to tensile stress; and the layers of the flexible touch screen 1 located on one side of the neutral plane 30 adjacent to the center of curvature are subjected to compressive stress. In this embodiment, the covering layer 10 and the transparent adhesive layer 40 are layers located on one side of the neutral plane 30 away from the center of the curvature. Therefore, when the flexible touch screen 1 is bent in the first direction D1, the covering layer 10 and the transparent adhesive layer 40 are subjected to tensile stress. The first substrate 210, the first conductive layer 230, and the protective layer 50 are layers located on one side of the neutral plane 30 adjacent to the center of curvature. Therefore, when the flexible touch screen 1 is bent in the first direction D1, the first substrate 210, the first conductive layer 230 and the protective layer 50 are subjected to compressive stress.

Furthermore, the first conductive layer 230 has a strong compressive stress-resisting capability and a weak tensile stress-resisting capability. Therefore, the first conductive layer 230 is located on one side of the neutral plane 30 adjacent to the center of curvature, and can be subjected to compressive stress when the flexible touch screen 1 is bent in the first direction D1, thereby reducing problems such as circuits broken caused by the first conductive layer 230 being subjected to tensile stress. Understandably, when the first conductive layer 230 is located in the neutral plane 30, when the flexible touch screen 1 is bent in the first direction D1, the first conductive layer 230 is neither subjected to compressive stress nor tensile stress, so that the first conductive layer 230 is not affected by the bending direction of the flexible touch screen 1.

It should be particularly noted that, in general, the neutral plane 30 is located at a center of a thickness of the flexible touch screen 1, but due to difference in the materials of the layers of the flexible touch screen 1, the neutral plane 30 may be offset to a certain distance. For example, the neutral plane 30 may be inside the first substrate 210, or may be inside the transparent adhesive layer 40, and even when the flexible touch screen 1 is combined with the flexible display, the neutral plane 30 may be inside the protective layer 50 or inside the flexible display screen.

In practical applications, the first conductive layer 230 may be one layer or multiple layers.

The protective layer 50 is configured to protect the first conductive layer 230. In this embodiment, the protective layer 50 is a silica glass having a thickness of 0.0015 mm. For example, the protective layer 50 is made by cutting or grinding a larger piece of silica glass with a thickness of 0.0015 mm. Of course, the protective layer 50 can also be made of other flexible materials, such as plastic films.

Figure 5:
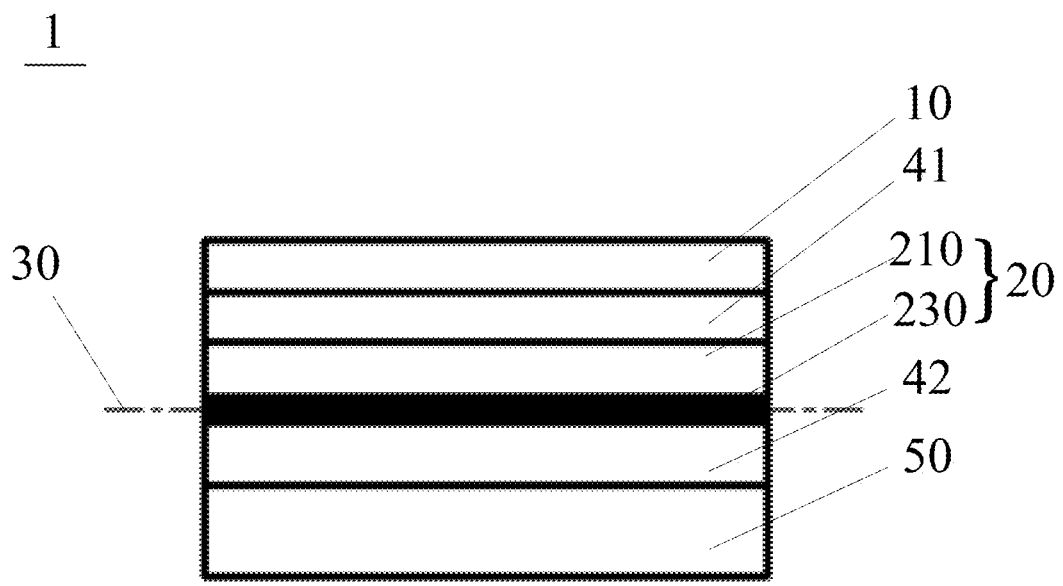
FIG. 5 is a schematic structural diagram of a flexible touch screen according to a third embodiment of the present disclosure.

Please referring to FIG. 5, FIG. 5 is a schematic structural diagram of a flexible touch screen according to a third embodiment of the present disclosure. The basic structure of the flexible touch screen 1 provided in the third embodiment is the same as that of the flexible touch screen provided in the second embodiment. The same components in the flexible touch screen 1 provided in the third embodiment and the flexible touch screen provided in the second embodiment have the same effects. The difference is that the flexible touch screen provided in the third embodiment includes two transparent adhesive layers, that is, the flexible touch screen 1 provided in the third embodiment includes a first transparent adhesive layer 41 and a second transparent adhesive layer 42. The first transparent adhesive layer 41 is located between the covering layer 10 and the first substrate 210, and is configured to adhere the covering layer 10 and the first substrate 210. The second transparent adhesive layer 42 is located between the first conductive layer 230 and the protective layer 50 and is configured to adhere the first conductive layer 230 and the protective layer 50. The protective layer 50 is located on one surface of the second transparent adhesive layer 42 away from the first conductive layer 230. In this embodiment, the neutral plane 30 is located inside the first conductive layer 230.

Figure 6:
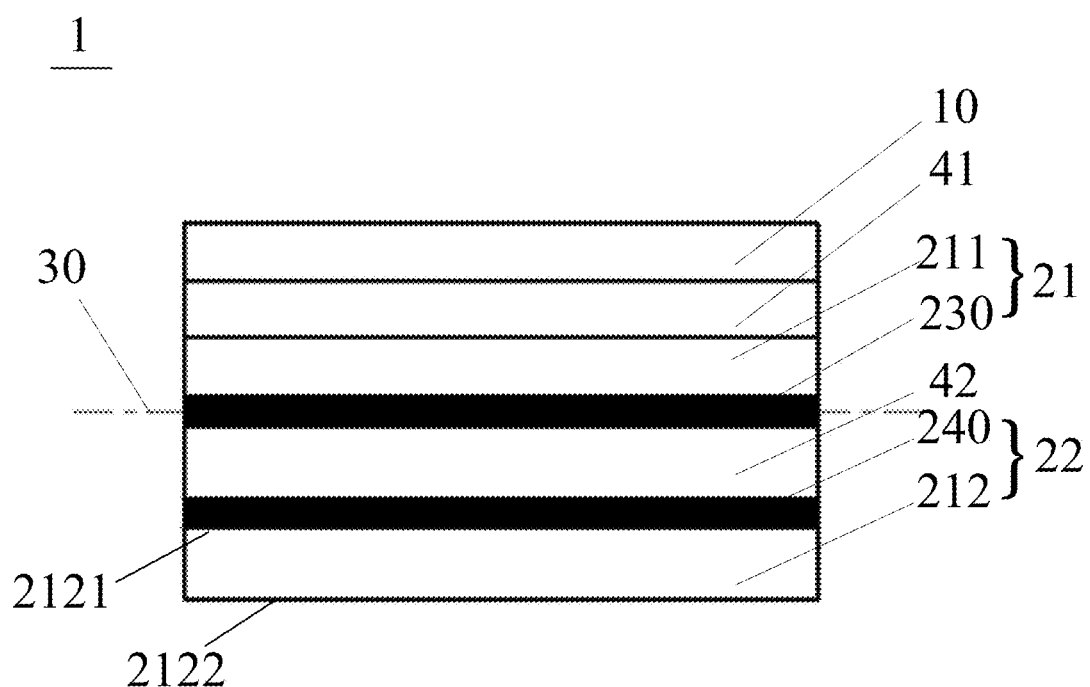
FIG. 6 is a schematic structural diagram of a flexible touch screen according to a fourth embodiment of the present disclosure.

Please referring to FIG. 6, FIG. 6 is a schematic structural diagram of a flexible touch screen according to a fourth embodiment of the present disclosure. The basic structure of the flexible touch screen 1 provided in the fourth embodiment is the same as that of the flexible touch screen 1 provided in the third embodiment. The same components of the flexible touch screen provided in the fourth embodiment and the flexible touch screen provided in the third embodiment have same effects. The difference is that the flexible touch screen provided in the fourth embodiment includes two touch layers, that is, the touch layer 20 in the flexible touch screen provided in the fourth embodiment includes a first touch layer 21 and a second touch layer 22. The flexible touch screen 1 includes a first transparent adhesive layer 41 and a second transparent adhesive layer 42. The first transparent adhesive layer 41 is located between the covering layer 10 and the first touch layer 21, and is configured to adhere the covering layer 10 and the first touch layer 21. The second transparent adhesive layer 42 is located between the first touch layer 21 and the second touch layer 22, and is configured to adhere the first touch layer 21 and the second touch layer 22. The covering layer 10, the first transparent adhesive layer 41, the first touch layer 21, the second transparent adhesive layer 42 and the second touch layer 22 are sequentially stacked. The first touch layer 21 includes a first substrate 211 and a first conductive layer 230. The first substrate 211 is located adjacent to the first transparent adhesive layer 41 compared with the first conductive layer 230. The first conductive layer 230 is located on one surface of the first substrate 211 away from the first transparent adhesive layer 41. The second touch layer 22 includes a second substrate 212 and a second conductive layer 240. The second substrate 212 includes a third surface 2121 and a fourth surface 2122 opposite to the third surface 2121, the second conducting layer 240 is located on the third surface 2121, that is, the second conductive layer 240 is located adjacent to the second transparent adhesive layer 42 compared with the second substrate 212. The second substrate 212 is located on one surface of the second conductive layer 240 away from the second transparent adhesive layer 42.

Figure 7:
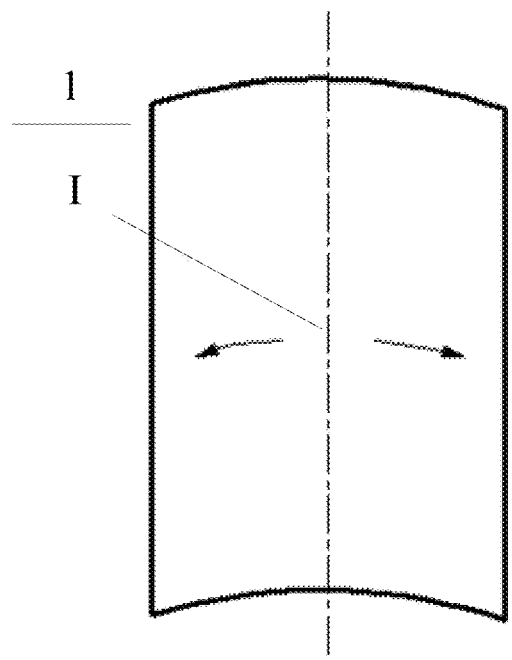
FIG. 7 is a schematic diagram of a first bent state of the flexible touch screen according to a fourth embodiment of the present disclosure.
Figure 9:
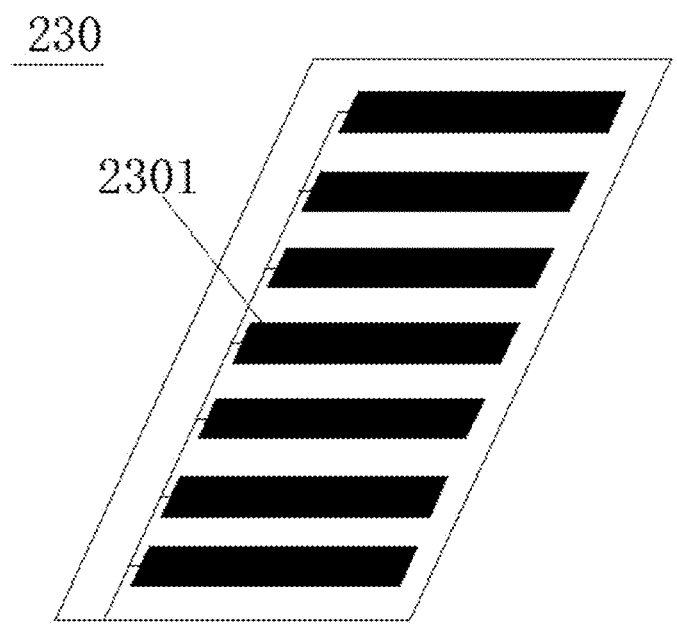
FIG. 9 is a schematic diagram of an arrangement of first conductive wires in a first bent state according to a fourth embodiment of the present disclosure.
Figure 10:
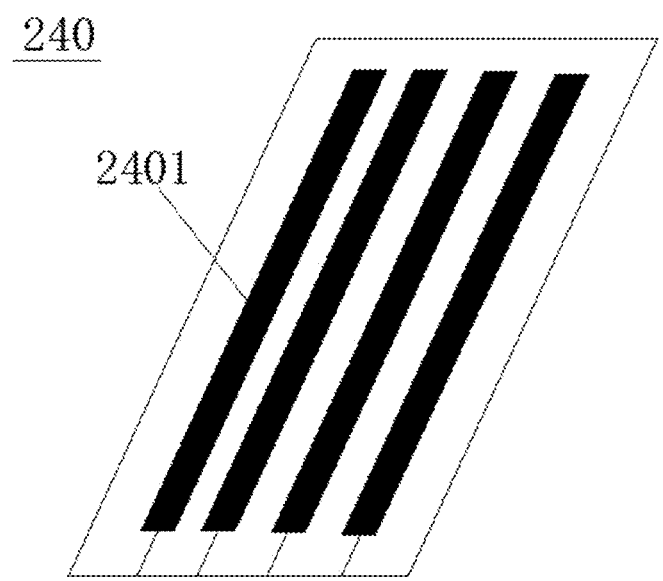
FIG. 10 is a schematic diagram of an arrangement of second conductive wires in a first bent state in a fourth embodiment of the present disclosure.

Please referring to FIGS. 6, 7, 9 and 10, FIG. 6 is a schematic structural diagram of a flexible touch screen according to a fourth embodiment of the present disclosure; FIG. 7 is a schematic diagram of a first bent state of the flexible touch screen according to a fourth embodiment of the present disclosure; FIG. 9 is a schematic diagram of an arrangement of first conductive wires in a first bent state according to a fourth embodiment of the present disclosure; FIG. 10 is a schematic diagram of an arrangement of second conductive wires in a first bent state according to a fourth embodiment of the present disclosure. In this embodiment, the flexible touch screen 1 is rectangular, and the flexible touch screen 1 includes a first bent state. When the flexible touch screen 1 is in the first bent state, short sides of the flexible touch screen 1 are in arc shapes, the first conductive layer 230 includes a plurality of strip-shaped first conductive wires 2301 separated from each other, and the second conductive layer 240 includes a plurality of strip-shaped second conductive wires 2401 separated from each other. When the flexible touch screen 1 is in the non-bent state, the first conductive wires 2301 are parallel to the short sides of the flexible touch screen 1, and the second conductive wires 2401 are parallel to the long sides of the flexible touch screen 1. Referring to FIG. 7, the flexible touch screen 1 is in the first bent state, that is, bended along the long axis I. The first bent state is bending along the long axis I, the long axis I is parallel to the long sides of the flexible touch screen 1. The first conductive wires 2301 of the first conductive layer 230 in the first touch layer 21 are linearly arranged at intervals perpendicular to the long axis I. The second conductive wires 2401 of the second conductive layer 240 of the second touch layer 22 are linearly arranged in a intervals parallel to the long axis I. Since the first conductive wires 2301 of the first conductive layer 230 are perpendicular to the long axis I and can withstand less stress when the flexible touch screen 1 is bent along the long axis I, therefore, the first conductive layer 230 is placed at or near the neutral plane 30 in this embodiment. The second conductive wire 2401 of the second conductive layer 240 are parallel to the long axis I and can withstand greater stress when the flexible touch screen 1 is bent along the long axis I, therefore, the second conductive layer 240 can be placed away from the neutral plane 30. In this embodiment, the second conductive layer 240 can be placed on a position in the compression side during bending, it is beneficial to improve the bending resistance of the flexible touch screen 1.

Figure 8:
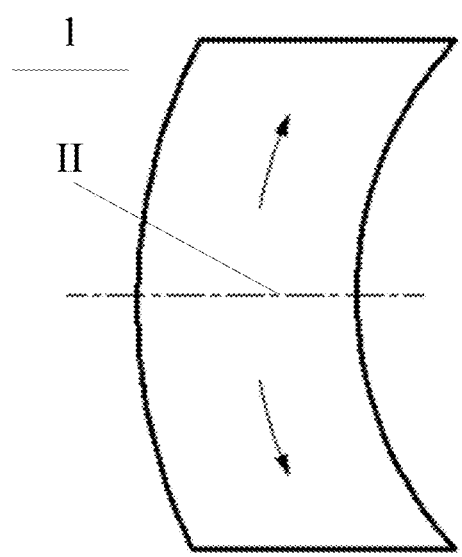
FIG. 8 is a schematic diagram of a second bent state of the flexible touch screen according to a fourth embodiment of the present disclosure.
Figure 11:
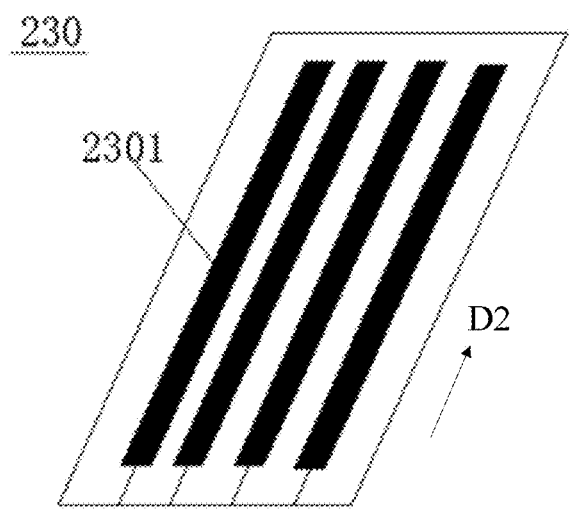
FIG. 11 is a schematic diagram of an arrangement of first conductive wires in a second bent state according to a fourth embodiment of the present disclosure.
Figure 12:
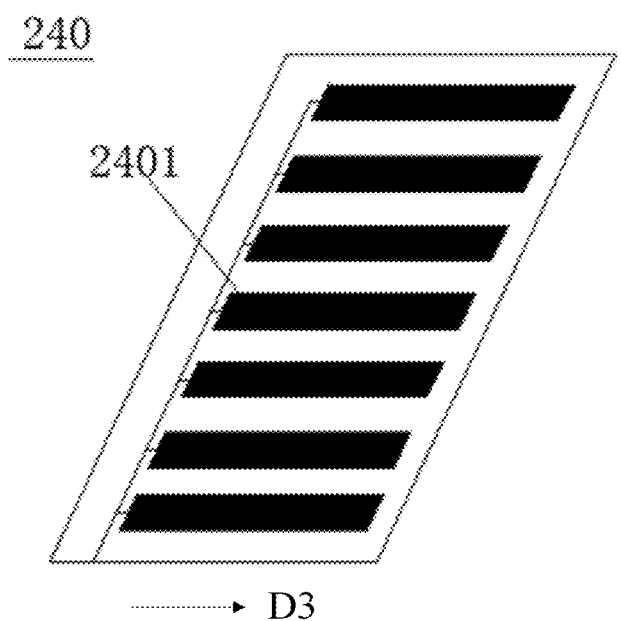
FIG. 12 is a schematic diagram of an arrangement of second conductive wires in a second bent state according to a fourth embodiment of the present disclosure.

Please referring to FIGS. 6, 8, 11 and 12, FIG. 6 is a schematic structural diagram of a flexible touch screen according to a fourth embodiment of the present disclosure; FIG. 8 is a schematic diagram of a second bent state of the flexible touch screen according to a fourth embodiment of the present disclosure; FIG. 11 is a schematic diagram of an arrangement of first conductive wires in a second bent state according to a fourth embodiment of the present disclosure; FIG. 12 is a schematic diagram of an arrangement of second conductive wires in a second bent state according to a fourth embodiment of the present disclosure. In this embodiment, the flexible touch screen 1 is rectangular, and the flexible touch screen 1 includes a second bent state. When the flexible touch screen 1 is in the second bent state, the long sides of the flexible touch screen 1 are in arc shapes, the first conductive layer 230 includes a plurality of strip-shaped first conductive wires 2301 separated from each other, and the second conductive layer 240 includes a plurality of strip-shaped second conductive wires 2401 separated from each other. When the flexible touch screen 1 is in the non-bent state, the first conductive wires 2301 are parallel to the long sides of the flexible touch screen 1, and the second conductive wires 2401 are parallel to the short sides of the flexible touch screen 1. Referring to FIG. 8, when the flexible touch screen 1 is in a second bent state, that is, bended along the short axis II. The second bent state is bending along the short axis II. The short axis II is parallel to the short sides of the flexible touch screen 1. The first conductive wires 2301 of the first conductive layer 230 in the first touch layer 21 are linearly arranged at intervals perpendicular to the short axis II. The second conductive wires 2401 of the second conductive layer 240 of the second touch layer 22 are linearly arranged in intervals parallel to the short axis II. Since the first conductive wires 2301 of the first conductive layer 240 are perpendicular to the short axis II, and the stress which can be withstood by the first conductive layer 240 is less when the flexible touch screen 1 is bending along the short axis I, therefore, the first conductive layer 240 is located at or near the neutral plane 30 in this embodiment. The second conductive wires 2401 of the second conductive layer 240 are parallel to the short axis II, and the stress which can be withstood by the second conductive layer 240 is greater when the flexible touch screen 1 is bending along the short axis II, therefore, the second conductive layer 240 can be placed at a position away from the neutral plane 30. In this embodiment, the second conductive layer 240 can be placed at a position in the compression side during bending, it is beneficial to improve the bending resistance of the flexible touch screen 1.

The first conductive wires 2301 and the second conductive wires 2401 can be disposed in the display area of the flexible touch screen 1 or disposed in the non-display area of the flexible touch screen 1 correspondingly. The first conductive wire 2301 and the second conductive wire 2401 include but are not limited to the above-mentioned setting manner.

Figure 13:
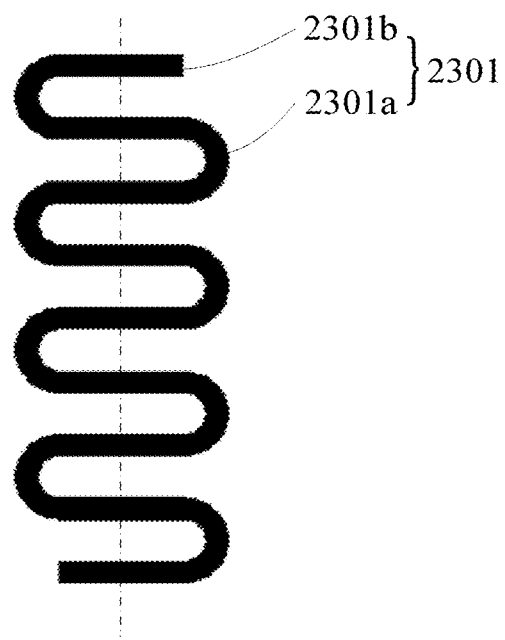
FIG. 13 is a schematic diagram of a first conductive wire and a second conductive wire in a curve form according to a fourth embodiment of the present disclosure.
Figure 14:
FIG. 14 is a schematic diagram of a first conductive wire and a second conductive wire in a linear form according to a fourth embodiment of the present disclosure.
Figure 15:
FIG. 15 is a cross-sectional view of a curve routing manner of a first conductive layer and a second conductive layer according to a fourth embodiment of the present disclosure.
Figure 16:
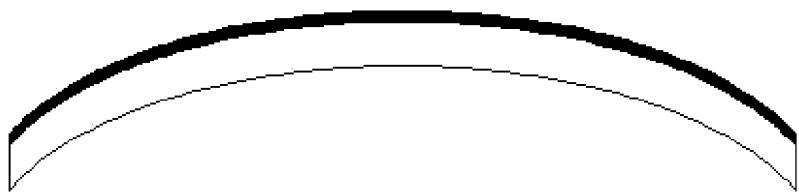
FIG. 16 is a cross-sectional view of a linear routing manner of a first conductive layer and a second conductive layer according to a fourth embodiment of the present disclosure.

Referring to FIGS. 6, 13, 14, 15, and 16, FIG. 6 is a schematic structural diagram of a flexible touch screen according to a fourth embodiment of the present disclosure; FIG. 13 is a schematic diagram of a first conductive wire and a second conductive wire in a curve form according to a fourth embodiment of the present disclosure; FIG. 14 is a schematic diagram of a first conductive wire and a second conductive wire in a linear form according to a fourth embodiment of the present disclosure; FIG. 15 is a cross-sectional view of a curve routing of a first conductive layer and a second conductive layer according to a fourth embodiment of the present disclosure; FIG. 16 is a cross-sectional view of a linear routing of a first conductive layer and a second conductive layer according to a fourth embodiment of the present disclosure. When the flexible touch screen 1 is in the second bent state, the long sides of the flexible touch screen 1 are in arc shapes. The first conductive layer 230 includes a first conductive wire 2301, and the second conductive layer 240 includes a second conductive wire 2401. The first conductive wire 2301 includes a plurality of first wire segments 2301a. An extension track of the first wire segments 2301a deviates from an overall extending direction of the first conductive wire 2301. The first conductive wire 2301 further includes a plurality of second wire segments 2301b that are alternately distributed with the first wire segments 2301a. The first wire segments 2301a each extends along a curve, and the second wire segments 2301b each extends along a straight line. In this embodiment, an extension track of the second wire segment 2301b is perpendicular to the overall extension direction of the first conductive wire 2301. Understandably, in other embodiments, the first conductive wire 2301 and the second conductive wire 2401 extend in an S-shaped curve, and the extending direction of the S-shaped curve is parallel to the long sides of the flexible touch screen 1. Referring to FIG. 13, when arrangement ways of the first conductive wire of the first conductive layer 230 and second conductive layer 240 are curved lines, a cross section of the flexible touch screen 1 is shown in FIG. 15. Referring to FIG. 14, when arrangement ways of the first conductive wire of the first conductive layer 230 and the second conductive layer 240 are straight lines, a cross section of the flexible touch screen 1 is shown in FIG. 16. The following description is made by taking the flexible touch screen 1 in the second bent state as an example, as shown in FIG. 8, that is, bending along the short axis II, mainly for routing in the non-display area (but not excluded in the display area). As can be seen from the cross-sectional views shown in FIGS. 15 and 16: when the first conductive wire 2301 of the first conductive layer 230 and the second conductive wire 2401 of the second conductive layer 240 are arranged as curved lines, the lines are divided into a plurality of small segments, each segment is independent, and the force of each segment is less affected by other segments, and a length of the wire affected by bending stress can be reduced. If the arrangement ways of the first conductive wire 2301 of the first conductive layer 230 and the second conductive wire 2401 are arranged in a linear form, the entire line as a whole will be affected by the overall stress. Therefore, the arrangement ways of the first conductive wire 2301 of the first conductive layer 230 and the second conductive wire 2401 of the second conductive layer 240 are arranged in a curve form, the stress applied at the bending position can be reduced, which is beneficial to improve the bending performance.

The curve wire may be an S-shaped curve, a poly line, or other forms of curves, including but not limited to the above-mentioned curve forms.

Furthermore, in at least one embodiment, the first conductive wire 2301 is a touch electrode of the flexible touch screen 1. Furthermore, the first conductive wire 2301 is a lead coupling to a touch electrode of the flexible touch screen 1, in details, the curved wire may be a lead connecting the first conductive wire 2301 or the second conductive wire 2401 to a bonding area or a touch IC, especially for the lead of the second conductive layer 240 in the second bent state, which is perpendicular to the short axis II. Therefore, the bending stress received is relatively greater. By designing this part of the lead into an S shape, the length of the bending stress on the lead can be effectively reduced, thereby reducing the probability of damage to the lead.

Figure 17:
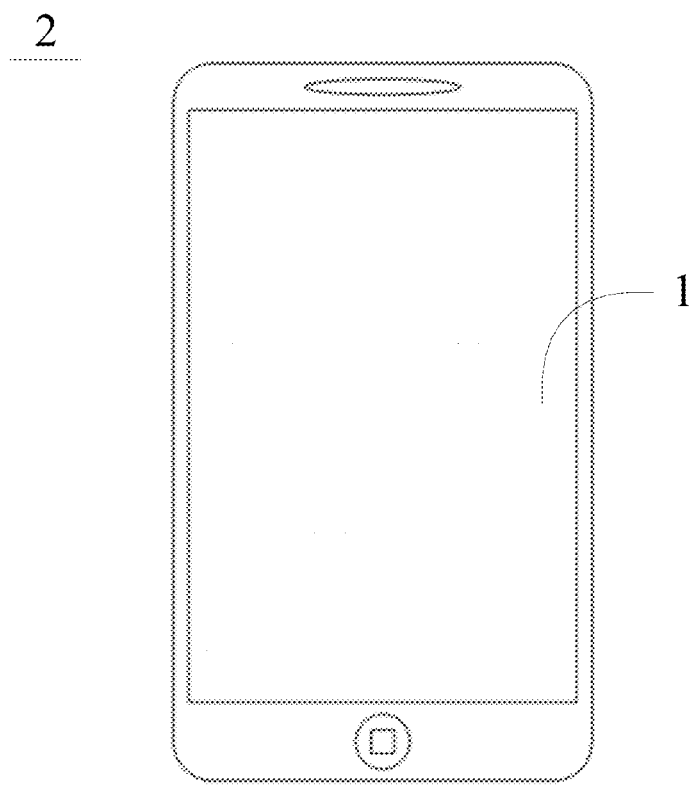
FIG. 17 is a schematic structural diagram of a flexible display device according to a preferred embodiment of the present disclosure.

The present disclosure also provides a flexible display device 2. Please referring to FIG. 17, FIG. 17 is a schematic structural diagram of a flexible display device provided by an embodiment of the present disclosure. The flexible display device 2 includes a flexible touch screen 1. For the flexible touch screen 1, refer to the foregoing description of the flexible touch screen, and the details are not described herein again. The flexible display device 2 may be, but is not limited to, a flexible e-book, a flexible smart phone (such as an Android mobile phone, an iOS mobile phone, a Windows Phone, etc.), a flexible tablet computer, a flexible palm computer, a flexible notebook computer, a mobile Internet device (MID) or a wearable device or so on.

The present disclosure has been described in detail above. It should be noted that the above embodiments are only used for explaining the technical solutions of the present disclosure, and are not limited thereto; although the present disclosure is described in detail with reference to the foregoing embodiments, those skill in the art should understand that: the scope of the present disclosure is not limited thereto, and any changes or substitutions that can be easily conceived by those skill in the art within the scope of the technical scope of the present disclosure are covered by the scope of the present disclosure. Therefore, the protection scope of the present disclosure is subject to the protection scope of the claims.

What is claimed is:

1. A flexible touch screen comprising a first substrate and a first conductive layer located on the first substrate, wherein, the first substrate comprises a first surface and a second surface opposite to the first surface; when the flexible touch screen is bent in a first direction in a manner that the first surface becomes convex and the second surface becomes concave; the first conductive layer is located on one side of the first substrate where the first surface is located and is subject to compressive stress or zero stress,
   wherein the first conductive layer comprises a first conductive wire extending along a second direction, the flexible touch screen is bent around a first axis, and the second direction is perpendicular to the first axis.

2. The flexible touch screen according to claim 1, wherein the flexible touch screen has a neutral plane; the first conductive layer is located outside the neutral plane and subjected to compressive stress.

3. The flexible touch screen according to claim 1, wherein the flexible touch screen has a neutral plane, and the first conductive layer is located in the neutral plane.

4. The flexible touch screen according to claim 1, wherein the first axis maintains a straight state when the flexible touch screen is bent.

5. The flexible touch screen according to claim 1, wherein the flexible touch screen further comprises a second conductive layer; the second conductive layer comprises a second conductive wire extending along a third direction; the third direction is parallel to the first axis.

6. The flexible touch screen according to claim 5, wherein the second conductive layer is located on one side of the first conductive layer away from the first substrate.

7. The flexible touch screen according to claim 6, wherein the second conductive layer is insulated from the first conductive layer.

8. The flexible touch screen according to claim 5, wherein the second conductive layer is located on the second surface of the first substrate.

9. The flexible touch screen according to claim 1, wherein the first conductive wire comprises a plurality of first wire segments, and an extension track of each of the first wire segments deviates from an overall extending direction of the first conductive wire.

10. The flexible touch screen according to claim 9, wherein the first conductive wire further comprises a plurality of second wire segments distributed alternately with the first wire segments.

11. The flexible touch screen according to claim 8, wherein the first wire segments each extends along a curve, and the second wire segments each extends along a straight line.

12. The flexible touch screen according to claim 9, wherein an extension track of each of the second wire segments is perpendicular to an overall extension direction of the first conductive wire.

13. The flexible touch screen according to claim 11, wherein each of the first conductive wire extends in an S-shaped track.

14. The flexible touch screen according to claim 10, wherein the first conductive wire is a touch electrode of the flexible touch screen.

15. The flexible touch screen according to claim 10, wherein the first conductive wire is a lead coupling to a touch electrode of the flexible touch screen.

16. The flexible touch screen according to claim 1, wherein the flexible touch screen further comprises a covering layer and a first transparent adhesive layer; the covering layer serves as an encapsulation layer of the flexible touch screen; the first transparent adhesive layer is located between the covering layer and the first conductive layer, and is configured to adhere the covering layer and the first conductive layer.

17. The flexible touch screen according to claim 1, wherein the flexible touch screen further comprises a covering layer, a first transparent adhesive layer, a second transparent adhesive layer, and a protective layer; the covering layer serves as an encapsulation layer of flexible touch screen; the first transparent adhesive layer is located between the covering layer and the first substrate, and is configured to adhere the covering layer and the first substrate; the second transparent adhesive layer is located between the first conductive layer and the protective layer, and is configured to adhere the first conductive layer and the protective layer, and the protective layer is located on one surface of the second transparent adhesive layer away from the first conductive layer.

18. The flexible touch screen according to claim 1, wherein the flexible touch screen further comprises a second substrate, a second conductive layer, a covering layer, a first transparent adhesive layer and a second transparent adhesive layer; the second substrate comprises a third surface and a fourth surface opposite to the third surface; the second conductive layer is located on the third surface; the covering layer is served as an encapsulation layer of the flexible touch screen; the first transparent adhesive layer is located between the covering layer and the first substrate, and is configured for adhering the first covering layer and the first substrate; the second transparent adhesive layer is located between the second conductive layer and the first conductive layer, and is configured for adhering the first conductive layer and the first conductive layer.

19. A flexible display device, wherein the flexible display device comprises a flexible touch screen according to claim 1.

20. A flexible touch screen comprising a first substrate and a first conductive layer located on the first substrate, wherein,
the first substrate comprises a first surface and a second surface opposite to the first surface; when the flexible touch screen is bent in a first direction in a manner that the first surface becomes convex and the second surface becomes concave; the first conductive layer is located on one side of the first substrate where the first surface is located and is subject to compressive stress or zero stress;
the flexible touch screen further comprises a covering layer and a first transparent adhesive layer; the covering layer serves as an encapsulation layer of the flexible touch screen; and
the first transparent adhesive layer is located between the covering layer and the first conductive layer, and is configured to adhere the covering layer and the first conductive layer.

* * * * *